(12) United States Patent
Cantz

(10) Patent No.: US 8,795,759 B2
(45) Date of Patent: Aug. 5, 2014

(54) LOW DENSITY CONFECTIONERY COMPOSITIONS

(75) Inventor: Simone Patricia Cantz, Duebendorf (CH)

(73) Assignee: Barry Callebaut AG, Zurich (CH)

( * ) Notice: Subject to any disclaimer, the term of this patent is extended or adjusted under 35 U.S.C. 154(b) by 662 days.

(21) Appl. No.: 12/528,842

(22) PCT Filed: Feb. 26, 2008

(86) PCT No.: PCT/EP2008/001505
§ 371 (c)(1),
(2), (4) Date: Feb. 2, 2010

(87) PCT Pub. No.: WO2008/104361
PCT Pub. Date: Sep. 4, 2008

(65) Prior Publication Data
US 2010/0151110 A1      Jun. 17, 2010

(30) Foreign Application Priority Data

Feb. 27, 2007    (GB) .................................. 0703719.5

(51) Int. Cl.
*A23G 1/52* (2006.01)
*A23G 1/50* (2006.01)
*A23G 1/40* (2006.01)

(52) U.S. Cl.
CPC ... *A23G 1/52* (2013.01); *A23G 1/50* (2013.01); *A23G 1/40* (2013.01)
USPC .......................................... 426/631; 426/660

(58) Field of Classification Search
CPC .............. A23G 1/40; A23G 1/50; A23G 1/52
USPC .................................................. 426/631, 660
See application file for complete search history.

(56) References Cited

U.S. PATENT DOCUMENTS

| | | | | |
|---|---|---|---|---|
| 2,328,791 | A | * | 9/1943 | Drury .............................. 426/99 |
| 2,904,438 | A | * | 9/1959 | O'Rourke ...................... 426/660 |
| 3,607,309 | A | * | 9/1971 | Olney et al. .................... 426/571 |
| 4,045,583 | A | | 8/1977 | Jeffery et al. |
| 4,081,559 | A | | 3/1978 | Jeffery et al. |
| 4,251,561 | A | | 2/1981 | Gajewski |
| 4,410,552 | A | | 10/1983 | Gaffney et al. |
| 4,410,555 | A | | 10/1983 | Richardson |
| 5,342,635 | A | | 8/1994 | Schwab |
| 5,464,649 | A | * | 11/1995 | St. John et al. ................ 426/660 |
| 5,976,605 | A | | 11/1999 | Van Der Schueren |
| 6,805,889 | B1 | | 10/2004 | Jury |
| 2002/0176917 | A1 | | 11/2002 | Brown et al. |
| 2004/0022903 | A1 | | 2/2004 | Takeuchi et al. |
| 2004/0131752 | A1 | | 7/2004 | Best et al. |

FOREIGN PATENT DOCUMENTS

| | | |
|---|---|---|
| DE | 3129892 | 6/1982 |
| EP | 0033718 | 11/1983 |
| EP | 0 407 347 | 6/1990 |
| EP | 0485675 | 5/1992 |
| EP | 0230763 | 1/1993 |
| EP | 0940085 | 1/2003 |
| EP | 1166639 | 1/2005 |
| GB | 459582 | 1/1937 |
| GB | 459583 | 1/1937 |
| GB | 1490814 | 11/1977 |
| JP | 56-085245 | 11/1981 |
| JP | 59156246 A * | 9/1984 |
| JP | 62-163657 | 7/1987 |
| JP | 63-202341 | 8/1988 |
| JP | 3198742 | 8/1991 |
| JP | 03-201946 | 9/1991 |
| JP | 2002-315510 | 10/2002 |
| WO | WO 01/80660 | 11/2001 |
| WO | WO 2004/056191 | 7/2004 |
| WO | WO 2005/053418 | 6/2005 |
| WO | WO 2006/122823 | 11/2006 |

OTHER PUBLICATIONS

Jeffery M.S., Aeraed/Moulded Chocolate, The manufacturing Confectioner, Nov. 1989, pp. 53-56.*
http://www.brandtech.com/vac_unit.asp; vacuum unit conversion for 30mbar and 60mbar to inches of mercury, obtained Jul. 30, 2012, 6 pages.*
Metro, Steele, J., "Non-melting chocolate or Black Magic?", Jul. 28, 2009, p. 8.
International Starch Institute: "Composition of Glucose and Maltose Syrup", table found at the following link: http://www.starch.dk/isi/glucose/glucose.asp (last accessed on Jan. 5, 2010).

\* cited by examiner

*Primary Examiner* — Jyoti Chawla
(74) *Attorney, Agent, or Firm* — Hoxie & Associates LLC

(57) ABSTRACT

A confectionery composition comprises cocoa-based material, fat, glucose and sucrose. The composition comprises glucose in an amount of between 10% and 85% by weight based on the weight of the composition, has a weight ratio of glucose to sucrose of at least 0.5, preferably between 1.2 and 3.5, and has a weight ratio of glucose to fat of at least 0.5, preferably between 0.9 and 4. The composition has a density of less than 0.2 g/cm$^3$, preferably between 0.03 and 0.15 g/cm$^3$.

19 Claims, No Drawings

LOW DENSITY CONFECTIONERY COMPOSITIONS

CROSS REFERENCE TO RELATED APPLICATIONS

This application is a United States National Stage Application under 35 USC §371 of PCT/EP2008/001505, filed Feb. 26, 2008, which claims the benefit of GB 0703719.5, filed Feb. 27, 2007 the contents of each of which are incorporated herein by reference.

This invention relates to low-density confectionery compositions, and in particular to low-density chocolate compositions having a crunchy mouth-feel and texture, and to processes for their production.

Chocolate products have attractive flavours and properties. Conventional chocolate compositions consist of at least sugar and cocoa-based material, with milk powder, flavourings and other ingredients included depending on desired characteristics of the end-products.

Many confectionery products, including chocolate, are heat-sensitive, and tend to melt or deform when hand-held even when wrapped. U.S. Pat. No. 4,081,559 describes heat-resistant compositions.

U.S. Pat. No. 4,045,583 describes a method of manufacturing an expanded, temperature-resistant chocolate product.

U.S. Pat. No. 5,976,605 discloses the use of spray dried glucose as a sweetening agent in chocolate compositions.

US 2004/0022903 relates to hollow cakes containing puffed chocolate.

DE 3129892 discloses the preparation of moulded chocolates by moulding a cocoa emulsion and then removing water under vacuum. The aim of the process is to make chocolate without using a conche and to produce a low calorie product.

The present applicants have sought to overcome disadvantages of hitherto known confectionery compositions. In particular, the invention seeks to provide a low density confectionery composition.

In one aspect, this invention provides a low-density confectionery composition comprising cocoa-based material, fat, glucose and sucrose, wherein
  i. the glucose is present in an amount of between 10% and 85% by weight based on the weight of the composition;
  ii. the weight ratio of glucose to sucrose is at least 0.5, preferably between 1.2 and 3.5;
  iii. the weight ratio of glucose to fat is at least 0.5, preferably between 0.9 and 4; and
  iv. the density is less than 0.2 g/cm$^3$, preferably between 0.03 and 0.15 g/cm$^3$.

Cocoa-based material is understood to include cocoa liquor, cocoa mass, cocoa powder, extracts or flavours derived from cocoa beans or mixtures thereof.

Choice of sugar impacts structure of the chocolate products of this invention, in particular the crunchiness. In the present invention, the mixture of glucose and sucrose is especially selected and the glucose content is between 10% and 85% by weight based on the total solid mixture/composition, preferably between 20% and 60% by weight. The ratio of glucose to sucrose is at least 0.5, preferably between 1.2 and 3.5. In order to facilitate handling and processing, glucose syrup is preferred. For example, the glucose may preferably be a glucose syrup having a (Dextrose Equivalent) DE of from about 30 to about 50, such as about 38 to about 45, or about 40 or about 42. It will be appreciated that, where glucose is added in the form of glucose syrup, the amount and ratios in i to iii are based on the weight of the dry matter of the added glucose syrup.

The fat component in the present invention is preferably selected from cocoa butter, cocoa butter equivalent, cocoa butter substitutes, cocoa butter replacers, palm oil, palm oil fractions, palm kernel oil, palm kernel oil fractions, coconut or fractions thereof, liquid oils (for example, sunflower oil and/or rapeseed oil and/or soy oil), interesterified mixtures of the above fats or fractions or hardened components thereof, or mixtures thereof. The fat content plays an important role in the crunchiness and mouthfeel of the chocolate compositions. In the present invention, the fat content is below 30% by weight based on the total solid mixture/composition, preferably between 12% and 25% by weight. Since it is found that the ratio of glucose to fat can affect the foam structure of final product, the weight ratio is at least 0.5, preferably between 0.9 and 4.

Compositions of the invention preferably comprise less than 5% by weight of water, more preferably less than 2% by weight of water, such as from 0.1 to 2% or from 1.0 to 1.4% by weight of water.

Further components which may be included in the compositions of the present invention are other edible ingredients including dairy solids such as milk powder, full cream milk powder, buttermilk powder, skimmed milk powder, whey powder, whey products, yoghurt powder; nut, cereals, fruit, cream or mixtures thereof; and edible emulsifiers such as lecithin, fractionated lecithin, PGPR and ammonium phosphatide.

Optional components of the confectionery composition of the invention include, for example, one or more colouring agents and flavouring agents and combinations thereof. Suitable flavouring agents include, but are not limited to, coffee, vanilla, caramel, fruit, nut, and vanilla flavourings, fruit powder and pieces, nuts, vanilla, herbs (e.g., mint), herb flavourings, caramel and caramel flavourings. Those skilled in the art are familiar with numerous flavourings than can be used.

The compositions of the invention may comprise inclusions. Suitable inclusions include any edible powder that is suitable for incorporation into chocolate, such as fruit powder, honey powder or a probiotic. The term "fruit powder" as used herein is intended to cover any particulate material having a size of less than about 1 mm that is derived from fruit and retains the flavour and/or aroma of the fruit. Fruit powders are available commercially. Fruit powders are preferably produced by drying, such as spray drying, vacuum drying, drum drying or freeze drying or a combination of these processes. Preferably, drying is carried out at a temperature which is sufficiently low to allow the flavour and/or aroma of the fruit to be retained. Fruit powders typically have a moisture content of below 10% by weight. Fruit powders are preferably produced from the fruit, as a pulp or concentrate, by drying to a water content less than 25% by weight of that of the original fruit. Other suitable inclusions include larger pieces (typically bigger than about 1 mm in their largest dimension) such as cereals, cocoa pieces, coffee pieces, fruit pieces, and combinations thereof.

The compositions of the invention are optionally coated (or enrobed). Preferably, the compositions are coated with a layer of chocolate or fat-based compound chocolate-like product. The chocolate or compound that is used for coating (or enrobing) may be dark, milk or white and is optionally coloured and/or flavoured. The chocolate or compound that is used for coating (or enrobing) may comprise edible inclusions.

Compared to conventional chocolate, the present low-density crunchy chocolate occupies a volume of 2 to 20 times the unexpanded volume. Typically the density is less than 0.2 g/cm$^3$, e.g. between 0.03 and 0.15 g/cm$^3$.

The unit fat and calorie contents are thus greatly reduced. The fat content may be reduced e.g. to less than 34% and the calorie content may be less than 14% per unit weight. On a volume basis, calorie content may be reduced 75% to 95% per unit compared to standard chocolate. This allows modest indulgence for consumers because an intense chocolate flavour is maintained.

The compositions of this invention are resistant to high temperatures in comparison with conventional chocolate. Thus, no deformation is observed after 2 months at 60° C. This is much more convenient for consumers when handling or storing such products, and provides advantages for "no mess" on-the-go snacking opportunities.

Compositions of this invention provide crunchiness similar to that of biscuits, thus providing pleasant mouthfeel. An intense flavour may be felt in the mouth, e.g. that of chocolate.

The compositions of this invention may be used alone, for example moulded into a variety of shapes and sizes. The compositions may be added as a co-component with confectionery or food products so as to increase indulgence, e.g. of taste and texture.

Preferred product forms for the composition of the invention include pieces, sticks and bars. The maximum dimension of the product form will generally range from about 1 mm to about 30 cm. Typically, the pieces will have a maximum dimension of from 1 mm to 5 cm. Sticks will generally be from 5 mm to 10 cm in length. Bars will usually be from 5 cm to 30 cm in length. Bars are typically packaged in a sealed wrapper.

The composition of the invention may be packaged for consumption in its own right. Alternatively, the composition may be mixed with other edible materials, such as in a breakfast cereal (particularly when the composition is in the form of pieces), in a confectionery matrix (such as of chocolate or praline) or in snack bars.

The crunchy chocolate may be produced in expanded form. In general, the preparation process comprises melting cocoa-based material, mixing the material with glucose syrup at above 45° C., combined with or followed by high speed stirring. About 5% to 40% by weight water is added under stirring at a temperature of at least about 38° C. After about 15 minutes high speed stirring, the mixture is deposited, e.g. by way of moulding, shaping, extruding and/or positioning or a combination thereof. Thereafter, the deposited mixture is dried or baked at 70 to 95° C. for a period of from 10 minutes to 4 hours, more preferably 85 to 95° C. for a period of 1 to 4 hours, under vacuum conditions, e.g. under less than 50 mbar, e.g. 38 mbar. A drying or baking step permits a crunchy mouthfeel as well as a decrease in moisture content to less than 2% by weight, preferably between 1.0% and 1.4% by weight. It will be appreciated that the actual baking time in any given case will be dependent on the vacuum used and on the effectiveness of heat transfer into the product. However, generally, a higher vacuum, a higher temperature and greater volatiles content will lead to greater expansion and/or different expansion and foam structures.

In order to avoid sugar and/or fat bloom, the cooling step may be carried out in a conditioned area, one condition is that the maximum relative humidity is not more than 60%, more preferably not more than 50%.

Preferably, the confectionery product is stored at a relative humidity of less than 50%. This reduces softening and loss of shape of the product. Thus, the confectionery product is preferably packaged in a package that keeps the relative humidity within the package at less than 50% for at least 2 weeks, more preferably for at least 6 months and even more preferably for up to 2 years.

The final product may have a defined shape, compact surface which is smooth, e.g. glossy. Furthermore, the product is not sticky when hand-held, thereby improving stability during handling, storage or transport. The product may exhibit a pronounced chocolate taste while avoiding excessive sweetness; presents a crunchy mouthfeel and may avoid brittleness.

When a chocolate component is included in compositions of this invention, the chocolate may be "dark", "white" or of a light brown texture sometimes known as "milk chocolate".

The invention also provides a process for preparing a low-density crunchy confectionery product comprising the steps of:

i Melting and mixing cocoa-based material and glucose syrup at a temperature above 45° C.;

ii Under stirring, adding warm water (e.g., water at a temperature higher then room temperature, such as above 45° C.) to between 5% and 40% by weight of the product mixture;

iii Depositing the mixture;

iv Drying/baking the deposited mixture under vacuum conditions or substantially vacuum-like conditions; and v Cooling with a maximum relative humidity of 60%.

The low-density crunchy confectionery product is preferably a confectionery composition of the invention.

The cocoa-based material in i is preferably chocolate. The chocolate optionally contains inclusions. Preferably, the low-density crunchy confectionery product produced in the process of the invention is a composition of the invention. It will therefore be appreciated that other edible ingredients may optionally be present with the cocoa-based material and glucose syrup in i.

In part iii, the mixture will typically be deposited in a mould. The mould may be a mould from which the product is removed prior to consumption of the confectionery product, such as a metal or silicon mould. Alternatively, the mould may be edible. The use of edible moulds means that a step of removing the confectionery product is not required and that the confectionery product and the mould can be eaten together. Suitable edible moulds include, for example, moulds made from wafer, cookie, sugar candy and/or biscuit. The mould may be an open receptacle (e.g., half egg-shaped) or may be a hollow region within the material of the mould. Thus, the mould may only partially, or substantially completely, encapsulate the confectionery product. It will be appreciated that the mould must be capable of withstanding the process conditions.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise.

EXAMPLES

Example 1

The following components are used to prepare a confectionery product according to the invention based on dark chocolate:

|  | Weight % | Weight |
|---|---|---|
| Dark chocolate (total fat 37.7%, total cocoa solids 62%) | 48% | 120 g |
| Glucose (DE 42, 20% water) | 48% | 120 g |
| Water | 4% | 10 g |

The dark chocolate is melted at 55° C., mixed with glucose at 55° C. and stirred until the mixture is homogeneous. Water at 55° C. is added slowly while stirring. The final mix is then aerated well with a high-speed mixer for 15 minutes, moulded into the desired shapes and dried under vacuum at 38 mbar for 2.5 hours at 90° C.

| Final product composition: | |
|---|---|
| Fat (cocoa butter) | 21% |
| Saccharose | 21% |
| Glucose | 44% |
| Water | <2% |
| Weight ratios: | |
| Glucose/fat | 2.1 |
| Glucose/saccharose | 2.1 |
| Density: | 0.1 g/cm3 |

| Final product | | | | | | |
|---|---|---|---|---|---|---|
| Cocoa butter | saccharose | Glucose | Water | Glucose/saccharose | Glucose/fat | Density |
| Wt-% 21% | 21% | 44% | <2% | 2.1 | 2.1 | 0.1 g/cm³ |

No deformation is observed after two months storage at 60° C.

Example 2

The following components are used to prepare a confectionery product according to the invention based on milk chocolate using the process described in Example 1:

| Recipe | % | Gram |
|---|---|---|
| milk chocolate (total fat 36.2%) | 60% | 300 |
| Glucose syrup | 30% | 150 |
| water | 10% | 50 |
|  | 100% | 500 |

| | % | — |
|---|---|---|
| Final product information | | |
| fat (milk fat, cocoa butter) | 27 | |
| Saccharose | 29 | |
| Glucose | 28 | |
| water | <2 | |
| weight ratios: | | |
| Glucose/fat | 1.03 | |
| Glucose/saccharose | 0.97 | |

Example 3

The following components are used to prepare a confectionery product according to the invention based on white chocolate using the process described in Example 1:

| Recipe | % | Gram |
|---|---|---|
| white chocolate | 60% | 300 |
| Glucose syrup | 30% | 150 |
| water | 10% | 50 |
|  | 100% | 500 |

| | % | — |
|---|---|---|
| Final product information | | |
| fat (milk fat, cocoa butter) | 25 | |
| Saccharose | 33 | |
| Glucose | 28 | |
| water | <2 | |
| weight ratios: | | |
| Glucose/fat | 1.12 | |

-continued

| | % | — |
|---|---|---|
| Glucose/saccharose | 0.85 | |

Example 4

Example 3 can be repeated to produce a confectionery product containing inclusions of fruit powder by replacing the chocolate used in those examples with a chocolate having the following composition:

| Recipe | % |
|---|---|
| white chocolate recipe | 94% |
| fruit powder (based on fruit juice & maltodextrin) | 6% |
|  | 100% |

Example 5 (Comparative Example)

For comparative purposes, a confectionery product was prepared using the process described in Example 1 based on dark chocolate but with a lower amount of glucose. The following recipe was used:

| Recipe | % | Gram |
|---|---|---|
| chocolate (total fat 29.9%, . . . ) | 51% | 550 |
| Glucose syrup | 1% | 10 |
| sucrose | 27% | 290 |
| water | 21% | 225 |
| | 100% | 1075 |

| | % |
|---|---|
| Final product information | |
| fat (milk fat, cocoa butter) | 20 |
| Saccharose | 55 |
| Glucose | 1 |
| water | <2 |
| weight ratios: | |
| Glucose/fat | 0.05 |
| Glucose/saccharose | 0.02 |

It was found that the process did not work at this low ratio of glucose to sucrose (also referred to herein as "saccharose"). The product did not have a homogeneous surface, was hard, had very big bubbles on top, was not shiny, had very low inflation and was relatively hard.

Example 6 (Comparative Example)

A further comparative example was carried out based on dark chocolate but with a lower amount of glucose. The following recipe was used:

| Recipe | % | Gram |
|---|---|---|
| chocolate (total fat 29.9%, . . . ) | 47% | 500 |
| Glucose syrup | 9% | 90 |
| sucrose | 25% | 260 |
| water | 19% | 205 |
| | 100% | 1055 |

| | % | — |
|---|---|---|
| Final product information | | |
| fat (milk fat, cocoa butter) | 18 | |
| Saccharose | 51 | |
| Glucose | 9 | |
| water | <2 | |
| weight ratios: | | |
| Glucose/fat | 0.48 | |
| Glucose/saccharose | 0.17 | |

Again, the process failed to produce an acceptable product. The product had very big bubbles on top, was partly not shiny, had very low inflation and was relatively hard.

Example 7 (Comparative Example)

A process as described in DE 3129892 (Schotsman) was carried out using the following recipe:

| Component | wt % | weight (g) |
|---|---|---|
| Sugar | 44 | 176 |
| CMC | 38 | 152 |
| Cocoa butter | 15 | 60 |
| Cocoa powder | 3 | 12 |

The ingredients were mixed at 50-55° C. 1 wt % Lecithin and then 15 wt % water (based on the weight of the above formulation) were added. The resulting emulsion was filled into moulds and subjected to 290 mbar vacuum at 52° C.

A low density, expanded produce was not produced and the composition remained liquid at one week after the experiment was carried out.

The present invention provides improved confectionery compositions e.g. chocolate compositions in which the calorie and fat contents are reduced greatly per unit volume. Handling, processing and storage are improved, as are taste and mouthfeel. The compositions may be formed via expansion into any desired shape or size. The compositions of this invention are highly temperature stable.

The invention claimed is:

1. A confectionery composition having a crunchy mouthfeel and texture comprising cocoa-based material, less than 30% by weight fat, glucose and sucrose, wherein
   i. the glucose is present in an amount of between 10% and 85% by weight based on the weight of the composition;
   ii. the weight ratio of glucose to sucrose is 0.5 to 3.5, and is selected to provide said crunchy mouthfeel and texture;
   iii. the weight ratio of glucose to fat is between 0.9 and 4; and
   iv. the density is between 0.03 and 0.1 g/cm$^3$, and wherein the glucose is from glucose syrup, and the cocoa-based material is chocolate.

2. The composition of claim 1, wherein the glucose content is between 20% and 60% by weight.

3. The composition of claim 1, wherein the fat content is between 10% to 25% by weight.

4. The composition of claim 1, wherein the fat is selected from cocoa butter, cocoa butter equivalent, cocoa butter substitutes, cocoa butter replacers, palm oil, palm oil fractions, palm kernel oil, palm kernel oil fractions or mixtures thereof.

5. The composition of claim 1 which additionally comprises dairy solids which dairy solids are selected from milk powder, full cream milk powder, buttermilk powder, skimmed milk powder, whey powder, whey products, yoghurt powder or mixtures thereof.

6. The composition of claim 1 comprising nut, cereals, fruit, cream or mixtures thereof.

7. The composition of claim 1 comprising an emulsifier selected from lecithin, fractionated lecithin and ammonium phosphatide.

8. The composition of claim 1 comprising less than 2% by weight of water.

9. Composition claim 1 wherein the cocoa-based material is selected from chocolate, cocoa liquor, cocoa mass, cocoa powder, extracts or flavors derived from cocoa beans and mixtures thereof.

10. The composition of claim 1, wherein the ratio of glucose to sucrose is between 1.2 to 3.5.

11. A process for preparing a low-density crunchy confectionery product according to claim 1 comprising the steps of:
   i. melting and mixing chocolate and glucose syrup at a temperature above 45° C.;
   ii. under stirring, adding warm water to between 5% and 40% by weight of the product mixture;

iii. depositing the mixture;
iv. drying or baking the deposited mixture under vacuum conditions; and
v. cooling with a maximum relative humidity of 60%.

12. The process of claim 11, wherein the melting temperature i) is between 50° C. and 60° C.

13. The process of claim 11, wherein the added water is between 10% and 20% by weight.

14. The process of claim 11, wherein the deposition step comprises moulding, shaping, extruding or positioning or a combination thereof.

15. The process of claim 11, wherein the drying/baking temperature is between 85° C. and 95° C.

16. The process of claim 11, wherein the vacuum condition is between 30 and 60 mbar.

17. The process of claim 11, wherein the moisture content of dried/baked final composition is less than 2% by weight after drying/baking.

18. The process of claim 17, wherein the moisture content of dried/baked final composition is between 1.0% and 1.4% by weight after drying/baking.

19. The process of claim 11 wherein the cocoa-based material is selected from chocolate, cocoa liquor, cocoa mass, cocoa powder, extracts or flavors derived from cocoa beans and mixtures thereof.

\* \* \* \* \*